(12) United States Patent
Ruffini et al.

(10) Patent No.: US 10,299,316 B2
(45) Date of Patent: May 21, 2019

(54) COMMUNICATION BETWEEN BASE STATIONS IN A RADIO ACCESS NETWORK

(71) Applicant: Telefonaktiebolaget LM Ericsson (publ), Stockholm (SE)

(72) Inventors: Stefano Ruffini, Pisa (IT); Giulio Bottari, Pisa (IT); Fabio Cavaliere, Pisa (IT); Paola Iovanna, Pisa (IT); Filippo Ponzini, Pisa (IT); Roberto Sabella, Pisa (IT); Stefano Stracca, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/574,194

(22) PCT Filed: May 29, 2015

(86) PCT No.: PCT/EP2015/062038
§ 371 (c)(1),
(2) Date: Nov. 15, 2017

(87) PCT Pub. No.: WO2016/192764
PCT Pub. Date: Dec. 8, 2016

(65) Prior Publication Data
US 2018/0146509 A1      May 24, 2018

(51) Int. Cl.
*H04W 88/08* (2009.01)
*H04B 10/2575* (2013.01)
(Continued)

(52) U.S. Cl.
CPC ......... *H04W 88/14* (2013.01); *H04L 12/6418* (2013.01); *H04W 88/085* (2013.01); *H04W 92/20* (2013.01)

(58) Field of Classification Search
CPC ..... H04W 88/14; H04W 92/20; H04W 76/16; H04W 88/085; H04L 12/6418; H04L 25/03904; H04B 7/2687; H04B 10/25753
See application file for complete search history.

(56) References Cited

U.S. PATENT DOCUMENTS 5,940,758 A * 8/1999 Chavez, Jr. ........... H04W 68/02
455/432.2
9,392,471 B1 * 7/2016 Thomas ............ H04W 36/0083
(Continued)

OTHER PUBLICATIONS

Common Public Radio Interface (CPRI), "Interface Specification", CPRI Specification V6.0, Aug. 30, 2013, pp. 1-128.
(Continued)

*Primary Examiner* — Andrew Wendell
(74) *Attorney, Agent, or Firm* — Patent Portfolio Builders, PLLC

(57) ABSTRACT

A network node (30) for a radio access network, wherein the network node comprises a switch system (35) configured to switch traffic for a plurality of base stations (3, 5; 8) of the radio access network. The switch system (35) is configured to provide for communication between a remote radio unit (3) and a baseband processing unit (5, 12) of the said plurality of base stations. The switch system (35) is configured to provide for communication between a first base station (8) and a second base station (3, 5) of said plurality of base stations. At least one of the first or second base station is a radio base station (8) comprising baseband processing.

19 Claims, 4 Drawing Sheets

(51) Int. Cl.
*H04W 88/14* (2009.01)
*H04W 92/20* (2009.01)
*H04L 12/64* (2006.01)

(56) References Cited

U.S. PATENT DOCUMENTS

| | | | | |
|---|---|---|---|---|
| 2006/0121944 | A1* | 6/2006 | Buscaglia | H04B 1/126 455/561 |
| 2009/0149221 | A1* | 6/2009 | Liu | H04W 88/085 455/561 |
| 2009/0191891 | A1* | 7/2009 | Ma | G01S 1/68 455/456.1 |
| 2009/0238127 | A1* | 9/2009 | Tsuji | H04L 41/00 370/329 |
| 2010/0234035 | A1* | 9/2010 | Fujishima | H04L 5/001 455/450 |
| 2011/0013714 | A1* | 1/2011 | Tamaki | H04L 25/03828 375/285 |
| 2011/0236024 | A1 | 9/2011 | Mao | |
| 2012/0163299 | A1* | 6/2012 | Chen | H04W 56/004 370/328 |
| 2013/0272170 | A1* | 10/2013 | Chatterjee | H04W 28/02 370/280 |
| 2013/0308626 | A1* | 11/2013 | Feng | H04J 3/0638 370/350 |
| 2015/0180626 | A1* | 6/2015 | Hao | H04L 5/0044 370/329 |
| 2016/0345192 | A1* | 11/2016 | Garg | H04W 24/04 |

OTHER PUBLICATIONS

3rd Generation Partnership Project, "Technical Specification Group Services and System Aspects; Network architecture (Release 13)", 3GPP TS 23.002 V13.1.0, Dec. 2014, pp. 1-109.

Telecommunications Standardization Sector of ITU, "Architecture and requirements for packet-based time and phase distribution", Series G: Transmission Systems and Media, Digital Systems and Networks Packet over Transport aspects—Quality and availability targets Series Y: Global Information Infrastructure, Internet Protocol Aspects and Next-Generation Networks Internet protocol aspects—Transport, Nov. 2013, pp. 1-30, G.8275/Y.1369.

Bladsjö, D. et al., "Synchronization Aspects in LTE Small Cells", IEEE Communications Magazine, Sep. 2013, pp. 70-77.

Haberland, B. et al., "Radio Base Stations in the Cloud", Bell Labs Technical Journal, 2013, pp. 129-152, vol. 18, No. 1.

Jungnickel, V. et al., "Software-Defined Open Architecture for Front- and Backhaul in 5G Mobile Networks", 16th International Conference on Transparent Optical Networks, Jul. 6-10, 2014, pp. 1-4.

\* cited by examiner

COMMUNICATION BETWEEN BASE STATIONS IN A RADIO ACCESS NETWORK

TECHNICAL FIELD

Embodiments herein relate to a network node for communication between base stations in a radio access network, a transport network for communication between base stations in a radio access network, and a method of operating a network node for communication between base stations in a radio access network.

BACKGROUND

In today's radio transport networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio transport network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In some RBS implementations a radio unit and a baseband processing equipment (digital unit (DU)) of the RBS are combined. In other implementations, the radio unit and DU are separated. In some examples, the radio unit and baseband processing equipment is split in two different locations. In this case, the radio unit is remote and termed a remote radio unit (RRU). As such, the system separates a RBS into one or more DU and RRUs. The radio unit creates the analog transmit RF signal from the baseband signal and provides the RF signal to an antenna. The radio unit correspondingly digitizes an RF receive signal.

The DU and RRU are connected via e.g. an optical network. The one or more DUs may be centralized and located remotely, for example a few kilometers from the RRUs. The RRUs are placed close to the radio antennas, e.g. in antenna masts. This minimizes feeder and jumper losses between antenna and RRUs, which is often a major challenge to address in most radio transport networks, for example, to enhance the uplink capacity of mobile services. The signal processing is centralized in a DU, which offers processing resources for multiple cells, each covered by an antenna driven by a RRU. This allows a pool of processing resources to be dynamically shared among many cells, in line with the cloud computing principle, saving energy, improving the radio link reliability and decreasing number and size of access sites.

A Common Public Radio Interface (CPRI) specifies a Time Division Multiplexing (TDM) like protocol for RBS configurations in a system configured for RRUs and DUs over a first layer. CPRI defines a protocol which is used to connect a DU and RRU. The application of CPRI between the DUs and the RRUs is static, i.e. determined as the RBS is deployed, and its configuration is only changed as part of a predetermined topology involving the DUs and RRUs.

CPRI requires accurate synchronization and latency control. Even if conventional CPRI transport is normally operated on fiber using point-to-point optical connections between DU and RRU distant less than a few hundreds of meters, there is a demand to extend its reach over geographical distances.

Traditional dedicated point to point links established between a limited number of DU ports and associated RRUs is inadequate to meet these new extended distance requirement. For example, the need of new installed fibers would be not sustainable as soon as the distances between RRU and associated digital unit became longer than a few kilometers.

For a RBS in which DU and RU units are integrated into a single network element covering a cell, inter-cell communication is handled through the X2 interface. The X2 interface provides communication between cells, and base stations, for example to manage overlaps.

The X2 interface, as said, can be used in a wide range of scenario including macro and small cells coordination and handover. Unfortunately, it is not always possible to establish X2 interfaces due to lack of physical connectivity or excessive latency, e.g. when X2 is transported by a tunneling across backhaul.

SUMMARY

In a first aspect of the disclosure, there is provided a network node for a radio access network, wherein the network node comprises a switch system configured to switch traffic for a plurality of base stations of the radio access network. The switch system is configured to provide for communication between a remote radio unit and a baseband processing unit of the said plurality of base stations. The switch system is configured to provide for communication between a first base station and a second base station of said plurality of base stations. At least one of the first or second base station is a radio base station comprising baseband processing.

Thus, communication between base stations is improved. This allows, for example, improved coordination.

In a second aspect of the disclosure, there is provided a transport network for a radio access network. The transport network is configured to connect a plurality of base stations of the radio access network. The transport network comprises the network node as claimed in any examples. The transport network further comprises an optical connection configured to carry traffic between the network node and the plurality of base stations. At least one of the first or second base station is a radio base station comprising baseband processing.

In a third aspect of the disclosure, there is provided a method for operating a switch system of a network node of a radio access network. The method comprising switching traffic between a remote radio unit and a baseband processing unit of one of a plurality of base stations of the radio access network. The method further comprising switching traffic between a first base station and a second base station of said plurality of base stations, wherein at least one of the first or second base station is a radio base station comprising baseband processing.

In a fourth aspect of the disclosure, there is provided a computer program product configured to implement the method of any example of the disclosure.

BRIEF DESCRIPTION OF THE DRAWINGS

Embodiments will now be described by way of example only in relation to the enclosed drawings, in which.

DETAILED DESCRIPTION

Aspects of the disclosure relate to a system and method to establish X2 links among base stations in a radio access network. The network is arranged to transport fronthaul (e.g. CPRI) data and packet (e.g. Ethernet) data over a shared network infrastructure. The network is based on a hub node where CPRI data is terminated and processed and Ethernet traffic is forwarded towards a subsequent network area. X2 links can benefit from the reduced latency ensured by a network which has been planned to transport the most challenging CPRI traffic. The X2 links use the same network, and same hub node, as the fronthaul and backhaul data.

Figure 1:
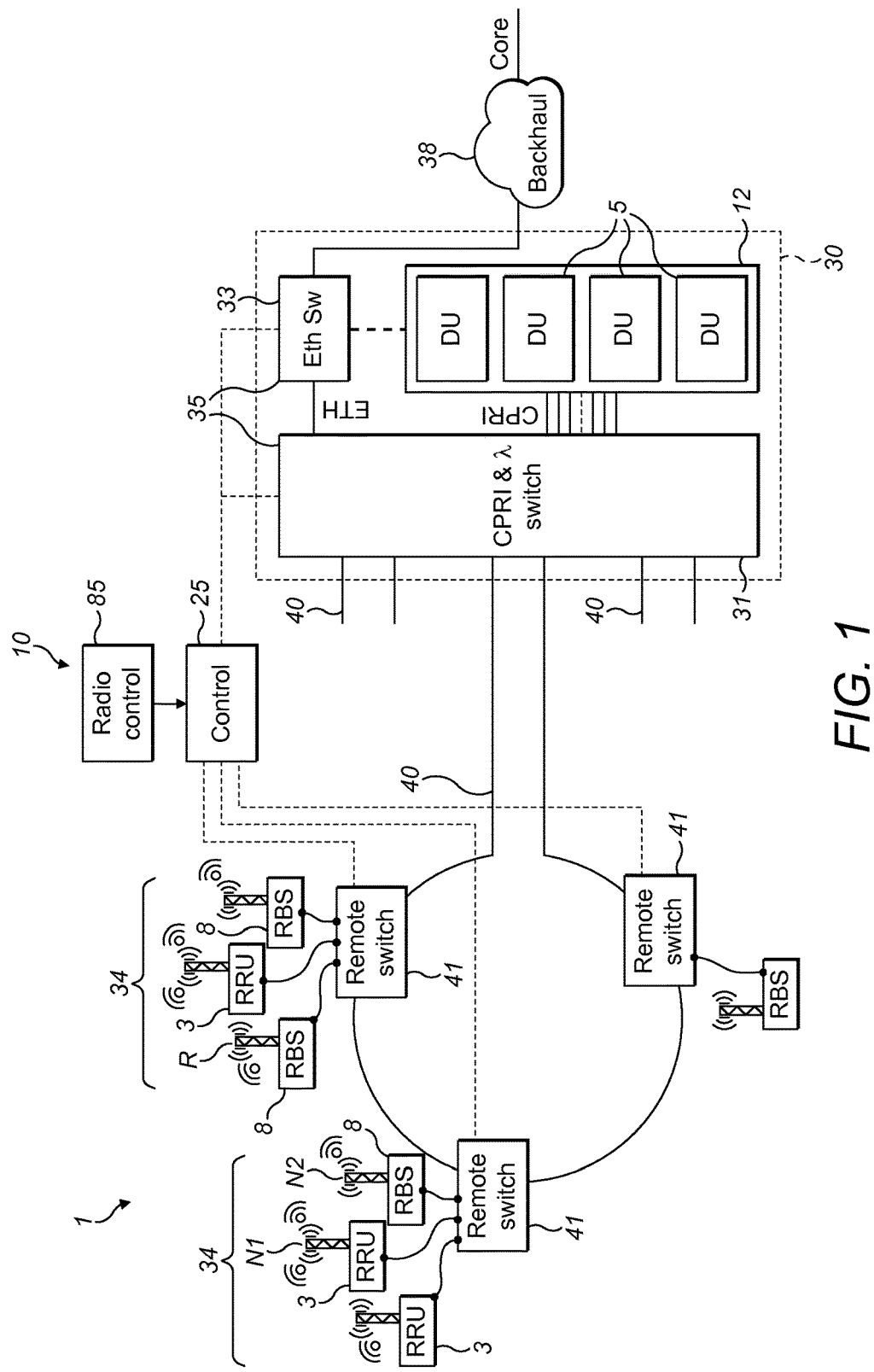
FIG. 1 is a schematic overview depicting a system according to an example of the disclosure.

FIG. 1 is a schematic overview of a network 1 having remote radio units 3 and digital units 5. The network 1 covers a radio access area. The network 1 may be considered as a radio access network, or a part of a radio access network. The network 1 is compliant with a number of radio access technologies such as LTE, LTE-Advanced, WCDMA, GSM/EDGE, WiMax, or UMB, to mention a few possible implementations. The network comprises separated RRUs 3 and DUs 5. In some examples, the DUs 5 are considered as located in a DU pool 12 comprising a plurality of DUs 5. The DU pool 12 may alternatively be termed a DU cloud or a baseband hotel. A term 'baseband processing unit' may refer to a DU or a DU pool in which baseband processing is carried for one or more RRU.

In some examples, the network 1 further comprises one or more radio base station 8 which comprises both a radio unit and baseband processing. Such an integrated, or monolithic, base station will be referred to as a base station or RBS. In some examples, the RBS serves a macro cell. Base stations (having baseband processing) and RRUs (without baseband processing) may both be considered as radio equipment.

The network 1 is configured to provide for fronthaul (i.e. between a RRU and DU), backhaul (i.e. to the core network), and for coordination between radio nodes. The coordination between radio nodes (X2) is provided by communication between the baseband part of base stations, i.e. communication between DUs, between a DU and a radio base station (including baseband processing) or between radio base stations (including baseband processing). The coordination between radio nodes may be considered as using the X2 interface, as standardized by 3GPP in the TS 36.42x-series of Technical Specifications.

In some examples, the RRU may alternatively be termed Radio Equipment (RE). In some examples, the DU may alternatively be termed a Main unit (MU), Radio Equipment Controller (REC) or Baseband Unit (BBU).

Aspects of the disclosure may be implemented in a heterogeneous network, where small cell and macro cells are used together (co-located), creating a "Heterogeneous" environment. Heterogeneous networks may operate in a single frequency band or in different frequency band. In order to maximize utilization of the radio spectrum, the same carrier frequency as the macro layer may be used. When deploying small cells on the same frequency as the macro cell, inter-cell interference may result. An example technique to address this issue is improving system performance by radio coordination. An example of such interference mitigation mechanisms are Coordinated Multipoint (CoMP) and Inter-Cell Interference Coordination (ICIC).

The requirements on synchronization accuracy and latency will depend on the type of radio features that are planned to be used to manage inter-cell interference. In particular some of the radio coordination techniques put very stringent requirements both in terms of latency and in terms of timing accuracy. These requirements may only be met by a centralized baseband arrangement.

This applies even when the RRUs are located at some physical distance from the baseband. In addition, requirements on jitter, delay and bandwidth between the baseband and the RU/RRUs are stringent. Coordination using a conventional mobile backhaul for which the expected delay would be in the order of milliseconds, not microseconds, may not be able to meet these requirements.

Examples of the disclosure provide for improved radio coordination, for example, allowing for one or more of Downlink Joint Transmission, Dynamic Point Blanking, or Coordinated Scheduling, or Enhanced Inter Cell Interference Coordination (eICIC). Aspects of the disclosure allows these techniques to be feasible for an access network including one or more RBS including baseband processing, as well as a centralized baseband processing supporting RRUs.

The RRUs 3 are connected with the DUs 5 via a transport network 10. The transport network 10 is configured to connect a selected RRU 3 with a selected DU 5 or DU pool 12.

In some examples, the transport network 10 allows a connection to be selected between any one of the DUs and any one of the RRUs. The RRUs 3 and DUs 5 are in general not co-located, but are sited in different locations. In some examples, at least some of the RRUs 3 are clustered together and/or at least some of the DUs 5 are pooled together.

In some examples, the transport network 10 comprises an optical and/or CPRI cross-connect. The transport network 10 provides for distributing and allocating an amount of baseband resources in DUs 5 to each of a set of RRUs 3 located in a geographical area. The transport network 10 further provides for backhaul for one or more RBS 8, and X2 connections between any combination of types of base station.

In this example, the RRUs 3 and RBS 8 are arranged in one or more clusters 34. Each cluster 34 comprises one or more radio nodes, i.e. one or more RRU 3 and/or one or more RBS 8 in any combination.

The DU pool 12 is connected to a core network (not shown) by a backhaul connection 38. The backhaul connection 38 may be considered as a backhaul cloud.

The transport network 10 between the RRUs 3, RBS 8 and DUs 5 comprises a network node 30, which may be considered as a central hub 30. The central hub 30 is connected between the radio nodes (RRUs and RBS) and the DUs. The central hub 30 may be geographically separate to the RRUs and DUs, or co-located, e.g. with the DU pool 12. The central hub may be considered as a network node of the radio access network.

The transport network 10 comprises an optical connection 40, e.g. one or more optical fibres. The optical connection 40 connects the RRU and RBS with the central hub 30. In some examples, the optical connection 40 is in the form of a ring. The optical connection 40 may utilize a plurality of wavelengths. For example, the optical connection 40 is configured to carry a Wavelength Division Multiplexed (WDM)

signal. In some examples, the optical connection 40 is configured to carry a Dense WDM (DWDM) signal.

An RRU of the network 1 communicates with a DU 5 using an interface standard, for example CPRI. References to CPRI are for example only, and may be replaced with a reference to any interface protocol for exchanging data (e.g. in digital form) between a RRU and DU for radio transmission by the RRU or baseband processing by the DU.

An RBS 8 of the network 1 does not output a CPRI signal, since the baseband processing is implemented internally. An RBS 8 outputs and receives data in a different format than used by a RRU for radio transmission or baseband processing (e.g. CPRI). The RBS 8 communicates with the core network and other base stations. In some examples, the RBS 8 communicates with the core network and other base stations using the same transport protocol for at least some transport layers. For example, the RBS 8 uses a packet based data transport. In some examples, the RBS 8 uses Ethernet, as defined by IEEE 802.1 and IEEE 802.3.

References to Ethernet are for example only, and may be replaced with a reference to any protocol for exchanging data to or from a radio base station, for example, packet transport. The transport connecting a base station may be based on a Layer 2 protocol on the Open Systems Interconnection model (OSI) model, or on a Layer 3 protocol.

The central hub 30 comprises a main switch or cross-connect 31. The main switch 31 is configured to cross-connect, i.e. switch, data between the RRUs and DUs. The main switch 31 is configured to switch the data transported between RRU and DU according to the interface standard, for example CPRI. As such, the main switch 31 is a CPRI switch. In some examples, the main switch 31 is an electronic switch. The CPRI switch may be configured to carry out switching at different granularities, as explained in more detail below.

The main switch 31 is also configured to switch data to or from the radio base stations 8. For example, the main switch 31 is configured to switch Ethernet data, Further details of the main switch 31 configured to switch data to or from a base station is described below. In this example, the switching is based on Layer 2 switching. Alternatively, switching at Layer 3 may be implemented.

The main switch 31 may also function as a lambda switch. As such, lambdas (wavelengths of light) are switched or cross-connected. The lambda switch function may be used for switching of CPRI data or Ethernet data.

Between a RRU and DU, user plane data is transported in the form of IQ data. Several IQ data flows are sent via one physical CPRI link. Each IQ data flow reflects the data of one antenna for one carrier, the so-called antenna-carrier (AxC). Each RRU may receive and send multiple AxC sub-flows.

In some examples, the main switch 31 is configured to provide for switching at a plurality of different granularities or layers. In particular, the electronic main switch 31 may be operated at different granularities, for example, down to the AxC level. In some examples, the electronic switch (cross-connect) 31 is able to switch received data at one or more level or layer, as described in more detail below.

In some examples, main switch 31 may be considered as a multi-layer switch. At a first layer, the main switch 31 switches optical wavelengths, e.g. by using a Wavelength Selective Switch (WSS)) or optical grey channels, e.g. by using a fiber cross connect. For example, one implementation is based on DWDM with optical-electronic-optical (OEO) regeneration, where optical wavelengths are converted in the electrical domain by means of transponders and switched electrically, e.g. by using an analogue cross-point switch. At a second layer, the switch granularity is less than a wavelength, for example, cross-connecting CPRI or Ethernet sub-flows with a determined granularity.

The main switch 31 is configured to selectively combine wavelengths (lambda granularity), and/or to combine CPRI flows, e.g. at 2.5G (CPRI granularity) and/or AxC sub-flows (AxC granularity).

The multi-layer main switch 31 is able to switch data at a plurality of different layers or granularity levels. This provides for the cross-connect to change an input to an output at a plurality of different layers. For example, the input is included in an output which is controlled at a plurality of different layers (e.g. lambda, CPRI, AxC) of the cross-connect; the output at each of the plurality of different layers being controlled by the multi-layer cross-connect. The plurality of different layers may refer to any two or more of the layers or granularities, e.g. two or more of AxC, CPRI (including any data rate, e.g. 2.5G, 10G), SAP (described below), or lambda (wavelength) granularity.

The central hub 30 operates optical-electrical conversion for ingoing signals and electrical-optical conversion for outgoing signals. One or more electro-optical converters (not shown) are at outputs of the electronic switch 31.

The central hub further comprises a packet switch 33. The packet switch 33 is configured to switch traffic between the backhaul connection 38 and the main switch 31. The packet switch 33 may also be configured to switch traffic between the backhaul connection 38 and the DU pool 12. In some aspects, the packet switch 33 switches using the same protocol as the RBSs 8 or DUs 5 use for backhaul. The packet switch 33 may be an Ethernet switch 33. The packet switch 33 may alternatively be referred to as a backhaul switch, configured to control switching onto the backhaul connection 38. The packet switch 33 operates at Layer 2 to switch traffic to its destination. Alternatively, the switch 33 may be a Layer 3 router.

The main switch 31 and packet switch 33 may be considered together as a switch system 35 or switch arrangement. The main switch 31 and packet switch 33 are co-located in the central hub 30.

The transport network 1 further comprises a remote switch 41 for each cluster 31. The remote switch 41 is configured to switch traffic to or from the one or more RRU and/or RBS from or to the transport network.

The optical connection 40 connects the main switch 31 and the remote switches 41. Communication between a port of the remote switch 41 an attached RBS or RRU may be with a further optical connection or with an electrical connection. The main switch 31 may be connected to one or more further optical connections 40 (only partially shown), for connection to additional RRUs and RBSs.

The remote switch 41 is configured to handle data traffic for both a RBS (e.g. Ethernet) and a RRU (e.g. CPRI). In some examples, the remote switch 41 is a lambda switch, configured to switch one or more wavelengths to the destination RBS or RRU. In some examples, the remote switch 41 is a reconfigurable optical add-drop multiplexer (ROADM). In this example, each RBS or RRU uses one or more lambda. Each lambda is particular to a RBS or RRU.

Alternatively, the remote switch 41 is configured to combine data from two or more RBS or RRU (in any combination) onto a single lambda. In some examples, data from both a RBS and a RRU are carried together on the same lambda. In this case, the digital unit is configured to use a framing protocol to transmit RBS data (e.g. Ethernet frames)

and RRU data (e.g. CPRI frames) together in the same optical channel. A corresponding framing is also carried out by the main switch 31.

In some examples, the remote switches 41 may be considered as multiplexing/switching modules. The remote switches 41 allocate and groom multiple CPRI flows in a single optical channel for communication with the hub 30. The remote switch 41 may be considered as a multiplexer/demultiplexer. The multiplexer/demultiplexer 41 is configured to WDM multiplex/demultiplex optical signals to/from the main switch 31. In some examples, data flows from a plurality of RRUs and/or RBSs are wavelength multiplexed/demultiplexed by the optical multiplexer/demultiplexer 41.

The multiplexer/demultiplexer 41 is configured to demultiplex optical channels received from the cross-connect 31, and WDM multiplex optical channels for transport to the cross-connect. As such, the multiplexer/demultiplexer 41 and multiplexer/demultiplexer 46 provide for WDM multiplexed transport between the cross-connect 31 and RRU clusters 34. As described above, the data for a plurality of radio nodes (RBS or RRU) may be multiplexed/demultiplexed by the remote switch 41 on a single optical channel, i.e. signal lambda. In some examples, the remote switches 41 are configured to time division multiplex (TDM) data flows relating to a plurality of RRUs and/or RBSs on a same optical channel. The optical channel may be provided by an optical signal, e.g. a particular wavelength in a WDM system, or a grey optical signal in a fibre whose wavelength is not strictly defined.

The main switch 31 and one or more remote switch 41 are connected to a controller 25. The controller 25 is arranged to configure and coordinate the remote and main switches 31,41. The controller 25 may also control the packet switch 22. In some examples, the controller 25 receives an input from radio control 85.

The controller 25 is arranged to configure the switches 31, 41 and 30 on the basis of radio requirements, for example, in response to a request of X2 connections between RRUs or between RRU-RBS, or between RBSs. Such connection requests are received from the radio control 85.

The controller 25 is configured to optimize resources of the network, by configuring the transport network. For example, controller 25 is configured to control the particular DU serving a RRU over time. For example, power consumption of the DUs may be reduced by switching-off one or more DU in the DU pool. The controller 25 facilitates or initiates this switching off by configuring transport to an active DU. Also, the number of active RBS may change according to traffic needs over time. The controller 25 is configured to dynamically, and on demand, to determine (compute) the right connectivity to meet X2 requests. The determination may be made based on one or more policy (e.g. resource optimization, power consumption reduction, administrative policy). In some aspects, the controller 25 provides control plane functions. As an example, the controller 25 dynamically establishes the association between radio nodes and pool of DUs.

Communication between base stations of the radio access network (X2 Ethernet) traffic can be bypassed at the hub node and is not processed by the backhaul network. For example, packet switch 33 directs X2 traffic to the destination RBS or DU, without switching onto the backhaul connection 38. In this way, base stations, for example belonging to different clusters or nodes, that need to be coordinated have the possibility to take advantage of a fast X2 connection. This enables the most advanced coordination features, as described. This leads to considerable enhancements in terms of radio resource use and capacity.

The operation of the central hub 30, and in particular, the switch system 35 is now described. The switch system 35 is configured to handle backhaul for the RBS 8, using the main switch 31 and packet switch 33. The packet switch 33 further provides a backhaul connection to the DUs 5.

For example, a RBS 8 labelled 'R' communicates data for backhaul to the remote switch 41, which multiplexes the data onto the optical connection 40 for transport to the central hub. At the central hub 30, the switch system 35 routes the data to the backhaul connection 38. The main switch 31 of the switch system 35 switches the data to the packet switch 33. The packet switch 33 switches the data onto the backhaul connection 38. The traffic originates at the RBS as Ethernet, and is carried as Ethernet through the switch system to the backhaul connection 38. Correspondingly, data from the backhaul connection (e.g. carried by Ethernet frames) is transmitted through the packet switch 33, main switch 31 onto the optical connection 40, to the remote switch 41 and to the destination RBS 8. The switch system 35 also switches fronthaul data between a RRU and DU.

Traffic originating at an example RRU 3 labelled as 'N1' is transported as CPRI over the optical connection 40, via a remote switch 41. The main switch 31 switches this data into the DU pool 12 to be baseband processed. For baseband processed data for transmission to the core network, the DU pool 12 transmits the data to the packet switch 33, and then forwarded to the backhaul connection 38. Correspondingly, data received from the backhaul connection 38 and intended to be broadcast from the RRU 'N1' is switched by the packet switch 33 to the DU pool 12. A DU 5 of the DU pool 12 generates a signal to be transmitted by the RRU, e.g. in CPRI format. The CPRI signal is output to the main switch 31, which switches the signal to the optical connection 40. The remote switch 41 connected to the RRU 'N1' extracts the signal, and outputs the signal to the RRU 'N1' for radio transmission.

The switch system 35 switches data between a RBS 8 and a base station having separated into a RRU and DU. The switch system 35 also switches data on an X2 interface between two RBSs 8. In some examples, the packet switch 33 functions to identify and switch data traffic intended for transmission to another base station. The communication between base stations takes substantially the same physical path as fronthaul communications. In some examples, the packet switch which controls the switching between base stations is co-located with at least one DU providing baseband processing.

In some aspects, the switch system 35 provides for fronthaul between a RRU and DU, and communications between a radio base station having baseband processing and another such RBS or a base station split into a RRU and DU. The switch system further provides switching onto a backhaul connection for both one or more RBS 8 and one or more DU 5. The switching between the radio base station having baseband processing and another such RBS or a base station split into a RRU and DU, and onto the backhaul connection, is implemented by the packet switch. DUs and RBSs 8 may use the same backhaul connection 38. Fronthaul between a RRU and DU uses the main switch 31, and not the packet switch 33. This arrangement allows the fronthaul network to be additionally used by a RBS 8 for X2 communications. This provides for improved X2 communications, and in particular, improved coordination between cells.

Figure 2:
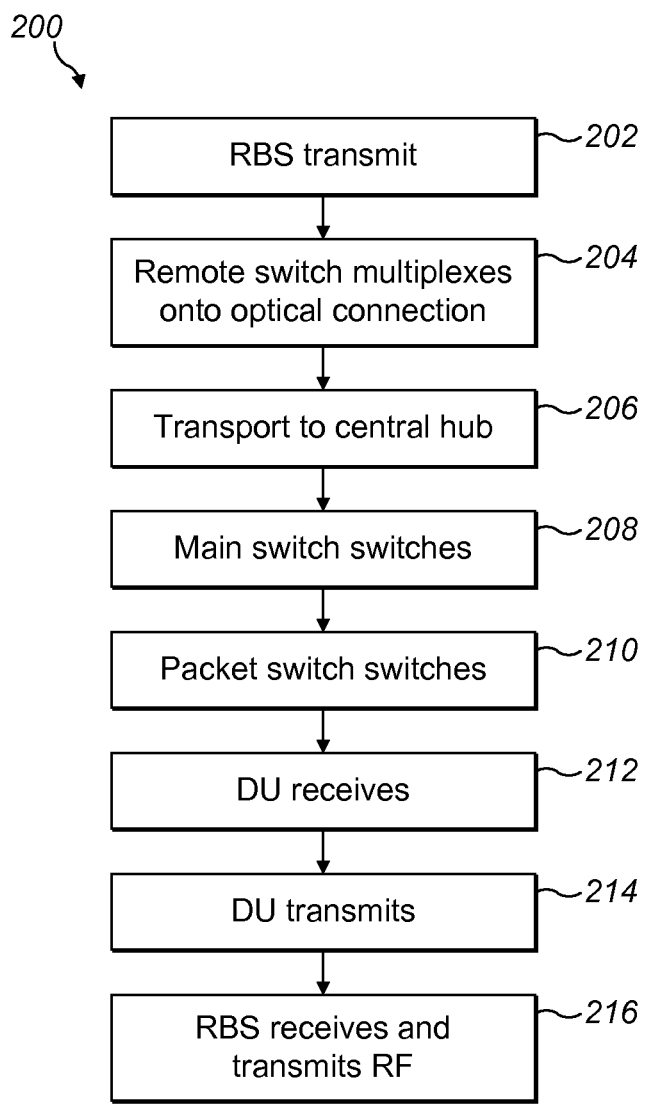
FIG. 2 is a schematic flowchart illustrating an example method of an aspect of the disclosure.

FIG. 2 shows an example method 200 for communication between a base station RBS 8 labelled 'R' and a base station having separated into a RRU labelled 'N1' and a DU.

In 202, RBS 8 labelled 'R' communicates data for the base station comprising RRU 'R' to the remote switch 41. For example, the data is carried as an Ethernet payload. In 204, the remote switch 41 multiplexes the data onto the optical connection 40 for transport to the central hub.

In 206, the data is transported to the central hub, e.g. by an optical WDM system. The optical connection 40 also transports fronthaul data between a RRU and a DU, for example, on different wavelengths or aggregated on the same optical channel with the X2 data and/or backhaul data.

At the central hub 30, the switch system 35 identifies and switches the data. In 208, the main switch 31 of the switch system 35 switches the data to the packet switch 33.

In 210, the packet switch 33 switches the data. The traffic from RBS R is identified by a specific VLAN Id at the packet switch 33. The packet switch determines the switching based on an identifier that the data is intended for a particular other base station. In some examples, the specific associations may be administrated via a table populated by the controller. As described, the table could report a specific VLAN Id.

In some aspects, the controller receives the request from radio control 85 in terms of RBS/RRU, related ports and information about X2 flow. For example, in case the X2 is transmitted on a certain VLAN id, such information is provided to the controller. In some aspects, the X2 flow is sent on the same physical port but belonging to a specific VLAN id. Processing of the RBS X2 data must be performed by the DU, therefore the VLAN is terminated at the central hub. According to the switching capability of each element controlled by the controller 25 (e.g. switches 31, 41, 30), the controller 25 provides the right connectivity.

At the packet switch 33, the VLAN is terminated and the X2 flow, part of the Ethernet payload, is sent to a particular DU 5 or the DU pool. Since the data is for a base station having a separate RRU and DU, the data is switched to the DU 5 which is providing baseband processing for the RRU labelled as 'N1'. Alternatively, the data is switched to the DU pool 12 for processing by one or more DUs 5.

In 212, the data from the RBS 'R' is received at the DU 5 associated with RRU 'N1'. The DU 5 processes the received data.

In 214, the DU 5 transmits signals (e.g. IQ data in CPRI format) to the RRU 'N1' based at least partially on the received X2 communication from RBS 'R'. The DU 5 sends the signal to the main switch 31, which switches the signal onto the optical connection 40.

A remote switch 41 is associated with the RRU 'N1', which is a different remote switch than used by the RBS 'R'. Alternatively, the remote switch 41 may be the same as used by RBS 'R'. The remote switch 41 associated with the RRU 'N1' demultiplexes the signal for the RRU 'N1', and transmits the signal to the RRU 'N1'.

In 216, the RRU 'N1' transmits a radio signal using the received CPRI signal from the DU 5.

Figure 3:
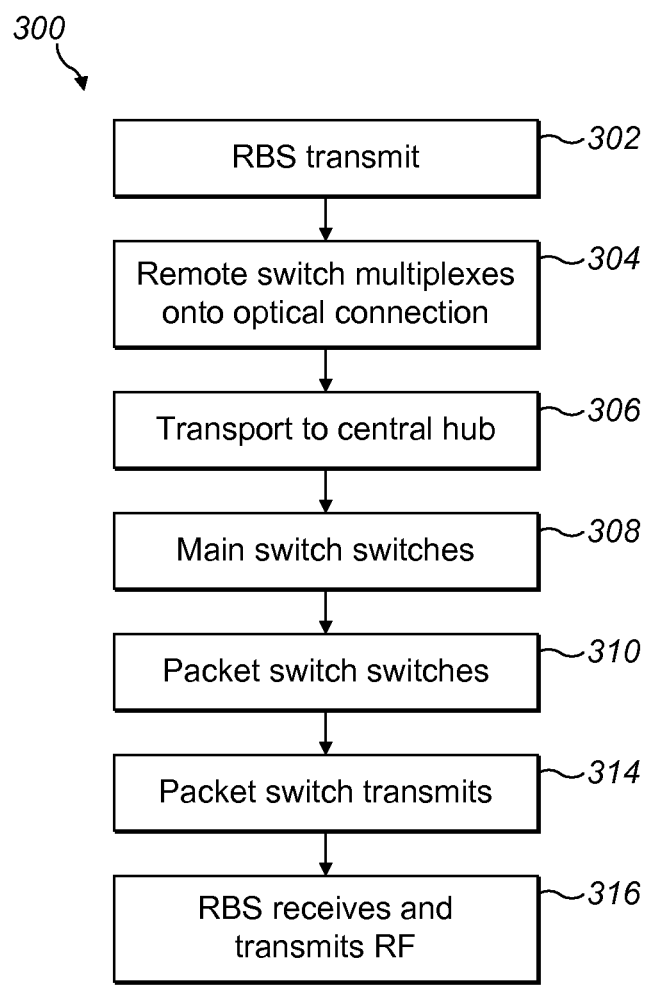
FIG. 3 is a schematic flowchart illustrating an example method of an aspect of the disclosure.

FIG. 3 shows an example method 300 for communication between a base station RBS 8 labelled 'R' and a base station RBS 8 also comprising baseband processing labelled 'N2'.

In 302, RBS 8 labelled 'R' communicates data for the base station RBS 'N2' to the remote switch 41. For example, the data is carried as an Ethernet payload. In 304, the remote switch 41 multiplexes the data onto the optical connection 40 for transport to the central hub.

In 306, the data is transported to the central hub, e.g. by an optical WDM system. The optical connection 40 also transports fronthaul data between a RRU and a DU, for example, on different wavelengths or aggregated on the same optical channel with the X2 data and/or backhaul data.

At the central hub 30, the switch system 35 identifies and switches the data. In 308, the main switch 31 of the switch system 35 switches the data to the packet switch 33.

In 310, the packet switch 33 switches the data. The traffic from RBS R is identified by a specific VLAN Id at the packet switch 33. The packet switch determines the switching based on an identifier that the data is intended for a particular other base station, as described above. The VLAN is terminated and the X2 flow, part of the Ethernet payload, is sent to the RBS 'N2'. For example, the X2 flow is coupled with the X2 flow coming from RBS N2 on a second VLAN. A second VLAN connects to the second RBS, in this case X2 is established between two RBSs.

In 314, the packet switch 33 transmits signals (e.g. carried in an Ethernet payload) to the RBS 'N2'. The packet switch 33 sends the signal to the main switch 31, which switches the signal onto the optical connection 40. A remote switch 41 is associated with the RBS 'N2', which is a different remote switch than used by the RBS 'R'. The remote switch 41 associated with the RBS 'N2' demultiplexes the signal for the RBS 'N2', and transmits the signal to the RBS 'N2'.

In 316, the RBS 'N2' processes the received data, and transmits a radio signal based at least partially on the received X2 communication from RBS 'R'.

The communication between a specific RBS with another RBS or with an RRU provides for coordination capabilities for the specific radio coverage needs.

Figure 4:
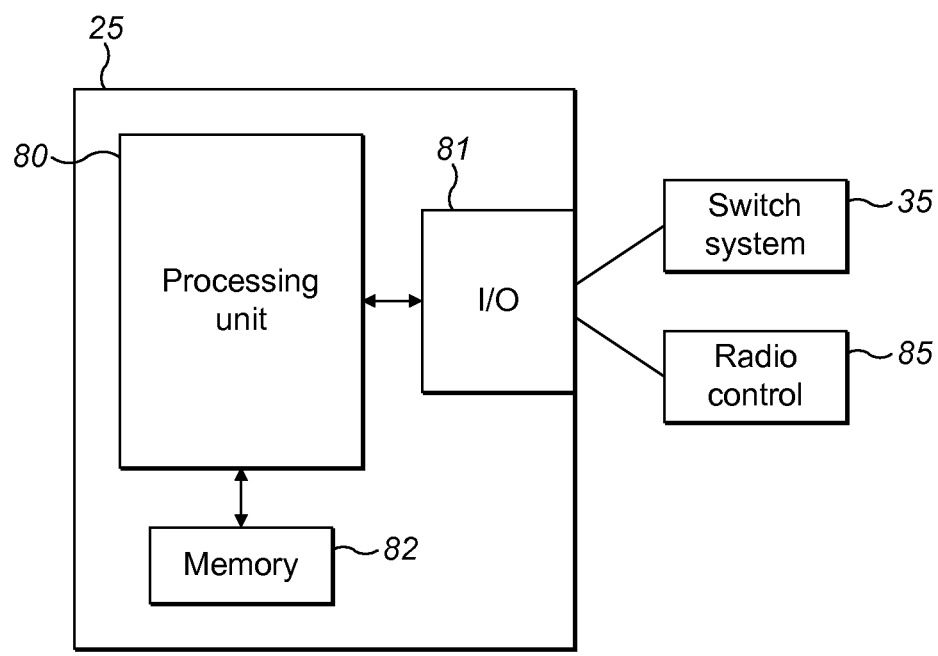
FIG. 4 is a schematic drawing of a part of the system according to an example of the disclosure.

FIG. 4 shows an example implementation of the controller 25. The controller 25 comprises a processing circuit 80, together with computer program code for performing the functions and/or method steps of the embodiments herein. An input/output unit 81 is connected to the processing unit in order to transmit commands to the switch system 35, i.e. main switch 31, packet switch 33 and the remote switches 41 at the location of the RRUs and RBSs of any example. In some examples, the input/output unit 81 may also receive information from a radio control 85, OSS or management entity. A memory 82 is also connected to the processing circuit 80, for operation of the processing circuit 80 and/or storing the current configuration of the switch system and any other parameters or data needed.

The controller 25 may be implemented in any suitable manner to control the switches. For example, the controller 25 may be part of a Software Defined Network (SDN). The main functional building blocks of the controller may be considered as processing functions, logic, databases, an interface to receive and provide information, interface to receive/provide commands from/to radio/switch elements. In some aspects, the radio control may be any suitable control, e.g. generic. For example, the radio control may be based on a Self-Organising Network (SON), or directly connect to a Operations Support System (OSS).

The program code mentioned above may also be provided as a computer program product, for instance in the form of a data carrier carrying computer program code for performing embodiments herein when being loaded into the controller 25. One such carrier may be in the form of a CD ROM disc. It is however feasible with other data carriers such as a memory stick. The program code may furthermore be provided as pure program code on a server and downloaded to the control unit 25.

In some cases, additional optical rings can be "stacked" to multiply the optical bandwidth in a given area. In this case the "optical X2" connection method can be used to provide X2 connectivity between RBSs and RRUs attached to nodes of different, stacked, optical rings. As a consequence, also cells belonging to different remote nodes (radio equipment, e.g. RRUs) could be adjacent or overlapping in order to benefit from radio coordination. In some aspects, different stacked rings are needed to serve a large number of RBS/RRU. The radio access network may provide radio coordination among RBS and RRU served by different rings or by different remote nodes. For example, different optical rings may be utilized when RBS and/or RRU are adjacent or partially overlapping and use radio coordination, in particular, at the cell edges.

The association between radio nodes can be statically defined or dynamically established via a control plane.

In some examples, the system provides for communication (i.e. X2) between two distributed base stations, each comprising a RRU and separate baseband processing in one or more DUs. In this example, X2 communication is provided by communication between DUs, e.g. within the DU pool 12.

In the examples described earlier, a common accurate timing and very limited latency is provided, enabling the deployment of demanding coordination features (e.g. Downlink Joint Transmission).

The switching arrangement provides for a low latency, which may be mostly contributed by the geographical distance (i.e. due to the finite speed of light). In an example configuration, the optical connection 40 extends over a few kilometers, meeting the CPRI requirements, and having a latency of at most 100 microseconds.

Some additional delay is due to the central hub switching, i.e. at the packet switch, that contributes to X2 latency. Although delay is expected due to e.g. processing and queuing, latency of less than 100 microseconds may still be provided. The low latency may also be used to support critical machine type communication applications.

Any additional delays due to additional framing and related buffering (mainly relevant in case of the X2 data sharing the same lambda as the CPRI data, e.g. via a framing arrangement) may be considered negligible (microsecond level).

In terms of timing, the relative phase difference between the base stations should be possible to be limited to less than 1 microsecond, so that the implementation of coordination features is possible. Various options are possible for distributing timing, especially for the case when X2 traffic is carried over the same lambda as CPRI traffic.

When Ethernet traffic is carried over a separate lambda to CPRI traffic, a specific synchronization solution may be implemented, for example for a RBS which is a pico RBS. In this case, the packet switch 33 deployed in the central hub may support a packet based network synchronization, for example, IEEE1588 or Precision Time Protocol.

In an example where a packet based network synchronization is not provided to all radio nodes, a performance of the timing delivered to the RBSs 8 would depend on the backhaul (Ethernet) switch characteristics and traffic load. A partial timing support deployment (i.e. IEEE1588 network, where some nodes do not support IEEE1588) may still provide microsecond absolute accuracy. A key synchronization aspect is the relative phase deviation between the radio nodes that have to be coordinated, i.e. in this example between RBSs (e.g. pico RBSs) or between the RBS and the RRU. In this arrangement, the relate phase deviation may only depend on the single packet switch 33 implemented in the central hub 30. The noise of the packet switch 33 may be limited to the microsecond range This provides for the implementation of all relevant coordination features.

Aspects of the disclosure provide a fronthaul WDM optical network, where one or more DU is connected to a plurality of clusters of RRUs and including a main CPRI switch, local to the DUs. Smaller remote CPRI switches are at each RRU cluster. The main and remote switches are enhanced to provide Ethernet switching capabilities so that conventional monolithic base stations can be connected at each cluster network node. Through these additional Ethernet links, X2 connections can be provided between two monolithic base stations sited at two different cluster nodes or between one DU in the pool and a monolithic base station. The X2 Ethernet traffic is bypassed at the central hub, and is not processed by the backhaul network (i.e. not transmitted on the backhaul connection 38).

In some examples, the optical connection connecting RRUs and RBSs to the central hub 30 comprises one or more ring of optical fiber. A plurality of RRU and RBS clusters 34 may be connected together, for example, arranged on a common optical ring. In some examples, the RRUs are connected with the central hub 30 via two optical rings. In some examples, two rings carry signals in opposite directions to/from the central hub 30.

Latency reductions will in general be particularly important also moving towards various 5G scenarios, where latency is one of the key requirements. For example, sub-millisecond latency may be required, e.g. for some critical machine type communication applications.

Aspects of the disclosure relate to a network node for communication between base stations in a radio access network, a transport network for communication between base stations in a radio access network, and a method of operating a network node for communication between base stations in a radio access network. Aspects of the disclosure also relate to a switching system, or a switch (e.g. packet switch), as described in any example. Aspects further relate to a computer program product configured to implement the method described in any example, for example, the operation of the packet switch.

The invention claimed is:

1. A network node for a radio access network, the network node comprising:
    a switch system configured to switch traffic for a plurality of base stations of the radio access network,
    wherein the switch system is configured to provide for communication between a remote radio unit of a distributed base station of the plurality of base stations and a separate baseband processing unit of the distributed base station of the plurality of base stations, wherein the remote radio unit and the separate baseband processing unit are located in two different locations,
    wherein the switch system is further configured to provide for communication between a first base station and a second base station of the plurality of base stations, and wherein at least one of the first and second base stations is a radio base station that comprises both a radio unit and baseband processing.

2. The network node of claim 1,
    wherein the first base station is the radio base station that comprises both the radio unit and the baseband processing, and
    wherein the second base station is the distributed base station, of the plurality of base stations, that comprises the remote radio unit and the separate baseband processing unit.

3. The network node of claim 1,
wherein the first base station is the radio base station, of the plurality of base stations, that comprises both the radio unit and the baseband processing, and
wherein the second base station is another radio base station, of the plurality of base stations that comprises both the radio unit and the baseband processing.

4. The network node of claim 1, wherein the switch system comprises a packet switch configured to provide communication between the first base station and the second base station.

5. The network node of claim 2,
wherein the switch system comprises a packet switch configured to provide communication between the first base station and the second base station, and
wherein the packet switch is further configured to switch packets between the first base station that comprises both the radio unit and the baseband processing and the separate baseband processing unit of the second base station, in communication with the remote radio unit.

6. The network node of claim 1, wherein the network node comprises the separate baseband processing unit.

7. The network node of claim 1, wherein the switch system is further configured to provide a connection between a base station, of the plurality of base stations, and a backhaul connection.

8. The network node of claim 1, wherein the switch system comprises a main switch configured to switch traffic to or from an optical connection connecting the network node with the plurality of base stations.

9. The network node of claim 8, wherein the main switch is further configured to switch at a lambda and/or Common Public Radio Interface (CPRI) flow granularity.

10. The network node of claim 1, wherein the communication between the first and second base stations is an X2 communication.

11. The network node of claim 4, wherein the packet switch is an Ethernet switch.

12. A transport network for a radio access network, wherein the transport network is configured to connect a plurality of base stations of the radio access network, and wherein the transport network comprises:
a network node for the radio access network, wherein the network node comprises:
a switch system configured to switch traffic for the plurality of base stations of the radio access network,
wherein the switch system is further configured to provide for communication between a remote radio unit of a distributed base station, of the plurality of base stations, and a separate baseband processing unit of the distributed base station, of the plurality of base stations, wherein the remote radio unit and the separate baseband processing unit are located in two different locations,
wherein the switch system is further configured to provide for communication between a first base station and a second base station, of the plurality of base stations, and wherein at least one of the first and second base stations is a radio base station that comprises both a radio unit and baseband processing; and
an optical connection configured to carry traffic between the network node and the plurality of base stations.

13. The transport network of claim 12,
further comprising one or more remote switches,
wherein one or more base stations comprising baseband processing and/or one or more remote radio units are attached to the optical connection by a remote switch, and
wherein the one or more remote switches are configured to:
switch data between the remote radio unit and the separate baseband processing unit; and
switch data transmitted between the first and second base stations.

14. A method for operating a switch system of a network node of a radio access network, the method comprising:
switching traffic between a remote radio unit, of a distributed base station of the plurality of base stations, and a separate baseband processing unit, of the distributed base station of the plurality of base stations of the radio access network, wherein the remote radio unit and the separate baseband processing unit are located in two different locations; and
switching traffic between a first base station and a second base station, of the plurality of base stations, wherein at least one of the first and second base stations is a radio base station that comprises both a radio unit and baseband processing.

15. The method of claim 14, wherein one of the following is true:
the first base station is the radio base station that comprises both the radio unit and the baseband processing, and the second base station is the distributed base station, of the plurality of base stations that comprises the remote radio unit and the separate baseband processing unit; and
the first base station is the radio base station of the plurality of base stations that comprises both the radio unit and the baseband processing, and the second base station is another radio base station, of the plurality of base stations that comprises both the radio unit and the baseband processing.

16. The method of claim 15, further comprising switching packets between the first base station that comprises both the radio unit and the baseband processing and the separate baseband processing unit of the second base station, in communication with the remote radio unit.

17. The method of claim 15, further comprising switching traffic between a base station, of the plurality of base stations, and a backhaul connection.

18. The method of claim 15, further comprising:
switching traffic to or from an optical connection connecting the network node with the plurality of base stations; and
switching, at one or more remote switches, traffic to or from a base station comprising baseband processing and/or one or more remote radio units.

19. A non-transitory computer readable recording medium storing a computer program product for controlling operation of a switch system of a network node of a radio access network, the computer program product comprising software instructions, which when run on processing circuitry of the switch system, cause the switch system to:
switch traffic between a remote radio unit, of a distributed base station of a plurality of base stations, and a separate baseband processing unit, of the distributed base station of the plurality of base stations of the radio access network, wherein the remote radio unit and the separate baseband processing unit are located in two different locations; and switch traffic between a first base station and a second base station, of the plurality of base stations, wherein at least one of the first and second base stations is a radio base station that comprises both a radio unit and baseband processing.

\* \* \* \* \*